W. R. MOTT.
FUME ABSORBER FOR ELECTRIC LAMPS.
APPLICATION FILED JAN. 27, 1917.
1,297,387.
Patented Mar. 18, 1919.
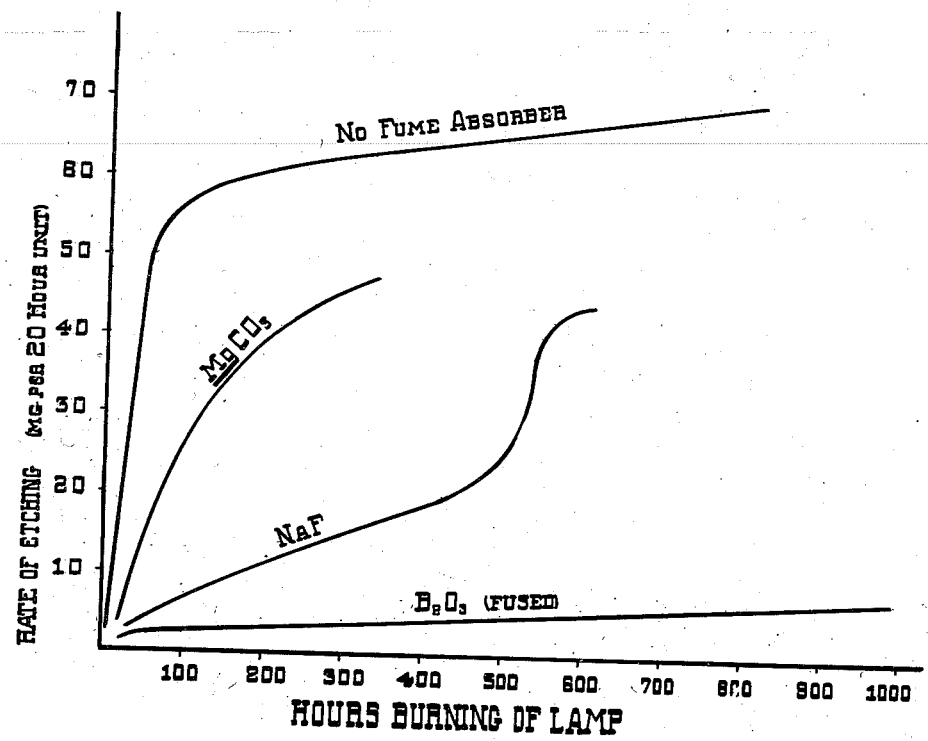
INVENTOR.
W. R. MOTT
BY
ATTORNEY

UNITED STATES PATENT OFFICE.

WILLIAM ROY MOTT, OF LAKEWOOD, OHIO, ASSIGNOR, BY MESNE ASSIGNMENTS, TO NATIONAL CARBON COMPANY, INC., A CORPORATION OF NEW YORK.

FUME-ABSORBER FOR ELECTRIC LAMPS.

1,297,387.      Specification of Letters Patent.      Patented Mar. 18, 1919.

Application filed January 27, 1917. Serial No. 144,865.

*To all whom it may concern:*

Be it known that I, WILLIAM R. MOTT, a citizen of the United States, residing at Lakewood, in the county of Cuyahoga and State of Ohio, have invented a certain new and useful Improvement in Fume-Absorbers for Electric Lamps, of which the following is a full, clear, and exact description.

This invention relates to flame arc lamps. As is well known such lamps employ electrodes having certain salts, oxids and other materials to increase the luminosity of the arc. Since it is essential that these materials volatilize and pass into the arc, more or less difficulty has been experienced from condensation on the glass globes and other parts of the lamps.

For most purposes, fluorid compounds (such as calcium fluorid, rare-earth fluorids, etc.) are indispensable for the flame arc electrodes, and these with the moisture of the air have a tendency to form at the arc some hydrofluoric acid (HF) which etches the glass globe and gradually decreases its power to transmit light, and may even wear out the globe. Alkaline silicates in the electrodes lessen etching, as the fumes are diminished by acting on such silicates rather than on the silicates in the glass. For this reason etching with cored electrodes is not very pronounced. With "solid flamers," however, sufficient alkaline silicates often cannot be used on account of slagging and other difficulties. It is with lamps employing such electrodes that this invention is of particular value.

The way that hot fluorids react with water vapor in the air to produce hydrofluoric acid in the arc, or in its vicinity, will be understood from the following equations, those given being typical of the reaction of other fluorids, the first reaction being partly reversible under usual lamp conditions:

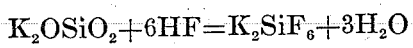

The above reactions can be readily shown to take place to a considerable extent by merely heating the fluorids to red heat in a suitable crucible over which is placed a current of air containing more or less water vapor. A similar production of hydrofluoric acid can be obtained by many other hot fluorids in contact with gases containing water vapor. From this it follows that it is important to eliminate not only the fluorin compounds, but also the hydrogen compounds which may combine with oxygen to form water. With this water and hydrogen containing material, a cycle of processes is established so that a little causes a great deal of etching. The first part of the cycle is given by the above equations and last part is the action of the hydrofluoric acid on the glass which is a composite silicate-containing material. The reaction on potassium silicate is given below by way of example.

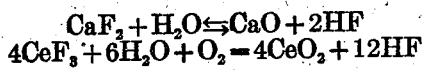

From this reaction it will be seen that water is formed which will start on its destructive cycle as soon as it evaporates.

It has been proposed to place magnesium oxid (or carbonate) in the condenser usually employed above the flame arc to absorb glass etching fumes, but I have found that certain compounds far exceed the ability of these compounds in this respect. The reactions with the magnesium oxid or carbonate returns the hydrogen to the circuit in the form of water in practically undiminished quantity. The reactions referred to are as follows:

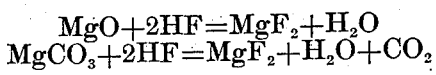

The materials that I have discovered to be especially good are those that are capable of absorbing, alone or jointly, both the fluorin part and a considerable part of the hydrogen constituent of the vapors in the arc chamber. In the preferred form of my invention, the same substance absorbs both fluorin and more or less hydrogen in reacting with hydrogen fluorid (HF) to produce complex fluorids that are by nature practically inert with respect to etching of glass or else are prevented from reaching the globe on account of their remaining trapped in the condenser. Boron compounds have a marked tendency to form such complex compounds, for instance borofluorids, and in general I prefer to utilize them for this purpose, but the desired property is possessed by certain compounds of potassium, sodium and barium which will be specifically referred to later.

The most efficient (under service tests) of the boron compounds, I have found to be fused boric acid (chiefly boron oxid ($B_2O_3$)) which reacts on the hydrofluoric acid vapors substantially in accordance with the following equation:

$$B_2O_3 + 8HF = 2HBF_4 + 3H_2O$$

Instead of all of the hydrogen being converted into water, as with magnesium oxid and carbonate, part remains in the complex fluorid. Also the liquid $HBF_4$ has a great tendency to retain water, hence the reaction adds but little water to the lamp atmosphere. Other intermediate products are formed, but these facilitate the speed of reaction and also have marked power to absorb water. Hydroborofluoric acid is practically non-volatile under the usual condenser conditions, and therefore the resulting product is largely retained in the condenser and does not injure the lamp globe or the delicate parts of the lamp mechanism. I have found that the beneficial effects of boron materials are obtained even when placed as a transparent coating on the glass, as the etching action of potassium fluorid and hydrofluoric acid, for example, are greatly retarded.

Borates also possess the desired characteristic of combining with hydrogen fluorid fumes, but these are not so efficient under service conditions in this respect as the boric oxid. By way of example, I may mention the borates of sodium, potassium and calcium which react with the hydrofluoric acid in accordance with the following equations, the equation for potassium borate being similar to that of sodium:

$$Na_2B_4O_7 + 16HF = 2NaBF_4 + 2HBF_4 + 7H_2O$$
$$CaB_2O_4 + 7HF = Ca(BF_4)_2 + 4H_2O$$

There are a number of calcium borates, but it is believed sufficient to give the reaction of only one. In my lamp tests, I obtained the better results with one part of calcium borate fused with several parts of boric oxid. The equation would then be a combination of the equation for calcium borate and that for boric oxid.

There are other boron compounds that react with hydrogen fluorid to render it harmless to a more or less extent, such as boron nitrid and boron fluorid which react in accordance with the following equations to produce complex fluorids:

$$BN + 4HF = NH_4BF_4$$
$$BF_3 + HF = HBF_4$$

The boron nitrid is peculiarly efficient in the weight of hydrofluoric acid absorbed both as to fluorin and as to hydrogen.

Still other materials capable of forming complex fluorin compounds in the warm condenser under service conditions are sodium, potassium and barium fluorids. My tests with sodium fluorid and potassium salts show them to be especially good, though not equal to boron oxid. These react in the following way:

$$NaF + HF = NaF \cdot HF$$
$$KF + HF = KF \cdot HF$$
$$KF + 2HF = KF \cdot 2HF$$

The products of the above reactions are quite stable even at fairly high temperatures. Hence there is no tendency to decompose at the temperature obtaining in the lamp condenser. Oxy-compounds of the above metallic elements, also can be used to form double fluorin compounds in some cases. Also fluorids of other metals, such as cæsium, rubidium and barium, accomplish the desired result.

In the single figure of the drawing I have shown various etching curves, the ordinates being the rate of etching in milligrams per 20 hour unit of time, and the abscissas hours of actual burning of the lamp. In all cases the conditions are identical. From these curves it will be seen that boric oxid is much superior to the other materials in fume absorbing properties.

As previously stated, I prefer to use boric acid in the lamp, and find that it is best to fuse this material in order to dehydrate it more or less before placing it in lamp parts to which arc fumes can come. While hydrated boric oxid or boric acid ($H_3BO_3$) could be used, it is not so desirable as the dehydrated material. The invention, however, includes both forms as well as material containing free or combined oxyboron compounds, as these will secure the desired results to a greater or less extent.

While water vapor in the lamp greatly promotes etching, I have found that a little water in the lamp actually decreases etching, when boric oxid is used. The reason for this is probably because the water softens the crust on the oxid and permits the chemical action to proceed at an undiminished rate. In other words, the beneficial effect of water on the boric oxid more than offsets the detrimental effect of enhancing the formation of hydrofluoric acid.

While in the claims I refer to my improved products as "fume absorbers", it must be understood that this is used for lack of a better term rather than for its accuracy.

To prevent or reduce etching, I also use dehydrating agents, such as $P_2O_5$ and other phosphoric oxycompounds for example, as I have found hydrofluoric acid will not etch glass if no moisture is present.

The fume absorbers referred to herein may be placed in any convenient part of the lamp, the most suitable place being in the condenser. The absorbers may be in block form or may be retained inside a gauze bag in powdered condition.

Having described my invention, what I claim is:

1. In electric arc lamps, electrodes adapted to form an arc containing glass-etching fluorids and a fume absorber containing a material adapted to combine with said fluorids to produce complex fluorids inactive toward glass.

2. In electric arc lamps, electrodes adapted to form an arc containing glass-etching fluorids and a fume absorber containing a material adapted to combine with said fluorids to produce complex acid-fluorids inactive toward glass.

3. In electric arc lamps, electrodes adapted to form an arc containing glass-etching fluorids and a fume absorber containing boron compounds adapted to combine with said fluorids to form complex fluorids inactive toward glass.

4. In electric arc lamps, electrodes adapted to form an arc containing glass-etching fluorids and a fume absorber containing boric oxid adapted to combine with said fluorids to form complex boro-fluorids inactive toward glass.

5. In electric arc lamps, electrodes adapted to form an arc containing glass-etching fluorids and a fume absorber containing fused boric oxid adapted to combine with said fluorids to form hydro-fluo-boric acid.

In testimony whereof, I hereunto affix my signature.

WM. ROY MOTT.